United States Patent [19]

Krieg

[11] 4,192,487
[45] Mar. 11, 1980

[54] APPARATUS FOR CUTTING SHEET PLATE

[76] Inventor: Adrian H. Krieg, 2627 Dunning Dr., Yorktown, N.Y. 10598

[21] Appl. No.: 925,819

[22] Filed: Jul. 18, 1978

[51] Int. Cl.² .......................... B23K 7/02; B23K 7/10
[52] U.S. Cl. ...................................... 266/58; 266/60; 266/73
[58] Field of Search .................. 266/58, 59, 60, 64, 266/67, 77, 66, 68, 71, 72, 73

[56] References Cited

FOREIGN PATENT DOCUMENTS

| | | | |
|---|---|---|---|
| 146151 | 6/1936 | Austria | 266/66 |
| 1029650 | 5/1958 | Fed. Rep. of Germany | 266/58 |
| 46-10934 | 3/1971 | Japan | 266/68 |
| 46-40092 | 11/1971 | Japan | 266/58 |

*Primary Examiner*—Paul A. Bell

[57] ABSTRACT

Sheet plate is cut with a carriage having an elongated support rod journalled therein for linear movement along a path parallel to the longitudinal axis of the rod. The carriage is propelled in a direction substantially perpendicular to the longitudinal axis of the rod. One end of the rod is provided with working means while the other end of the rod cooperates with an elongated guy so that the rod is carried by said carriage in a direction perpendicular to the axis of the rod while the work means maintains a fixed position parallel to the guy.

5 Claims, 3 Drawing Figures

APPARATUS FOR CUTTING SHEET PLATE

The present invention relates to a system for cutting steel plate and the like.

Great difficulty arises in cutting large sections of steel plate to size, particularly under field conditions and especially when the cut is made along a straight line. Up till now it has been difficult to lay out on large steel sheet an accurate guide, template or straight edge by which to be guided in cutting the plate, particularly when the cutter is manually moved or at least even when manually driven or guided across the plate.

Attempts have been made to utilize the rather sophisticated and expensive equipment, containing all sorts of automatic control means for guiding the cutting apparatus. Notwithstanding these complex systems, it remains difficult to cut a straight line on flat steel plate, largely because of the linear distance to be cut, and further because the plate itself is not perfectly flat or smooth so that the automatic equipment, is often skewed and set awry in its course, notwithstanding the sophistication of its control means.

In my copending applications, Ser. No. 614,431, filed Sept. 18, 1975 now U.S. Pat. No. 4,143,862 and Ser. No. 702,077 filed July 2, 1976 now abandoned and replaced with continuation application Ser. No. 00482, there is disclosed means for automatically cutting pipe and sheet plate with bevelled edges and contours, which has greatly improved operation on both arcuate and flat work pieces.

The present invention provides simple and non-complex apparatus which does not require complex programming, or complex control means for the cutting sheet plate material. According to the present invention the aforementioned problems are overcome by providing apparatus for cutting sheet plate material comprising a carriage in which an elongated support rod is journalled for linear movement along a path parallel to the longitudinal axis of the rod. The carriage is provided with means for propelling it in a direction substantially perpendicular to the longitudinal axis of the rod. The rod is provided with a work means at one end for operating n said workpiece and means on the other end cooperating with an elongated guide whereby the rod is carried by the carriage in a direction perpendicular to the axis of the rod while the work means maintains a fixed position parallel to the guide no matter what position the carriage takes during its movement.

Preferably, the work means is a torch, constructed in accordance with my aforementioned patent applications, although the work means may be a welding device or mechanical cutting means.

Further, in accordance with the present invention, the support rod is rectangular in cross section and is mounted or journalled within a pair of spaced box journals, having rollers engaging each of the faces of the rectangle to thereby prevent the rod from having any undue play and yet permit its free linear movement with respect to the carriage. The guy may be in the form of a wire, or elongated rail member. The sole purpose is to maintain parallel relationship between the workpiece while permitting the workpiece to traverse in a direction parallel to the guy itself. Since the carriage is relatively movable with respect to the rod, fixing of the rod on the guy produces no stress or strain on the guy and therefore the guy can be of simple and light construction. Furthermore, since the carriage is movable freely along the rod, the direction of movement of the carriage does not have to be controlled or regulated. Only the speed of the movement must be controlled with respect to the work means so that the work means can perform its desired function at any given point. Since the movement of the carriage and the arm are relatively free and independent of each other, the smoothness of the plate on which the carriage rides is of no importance.

Full details of the present invention are set forth in the following description and are shown in the accompanying drawings.

IN THE DRAWINGS

Figure 1:
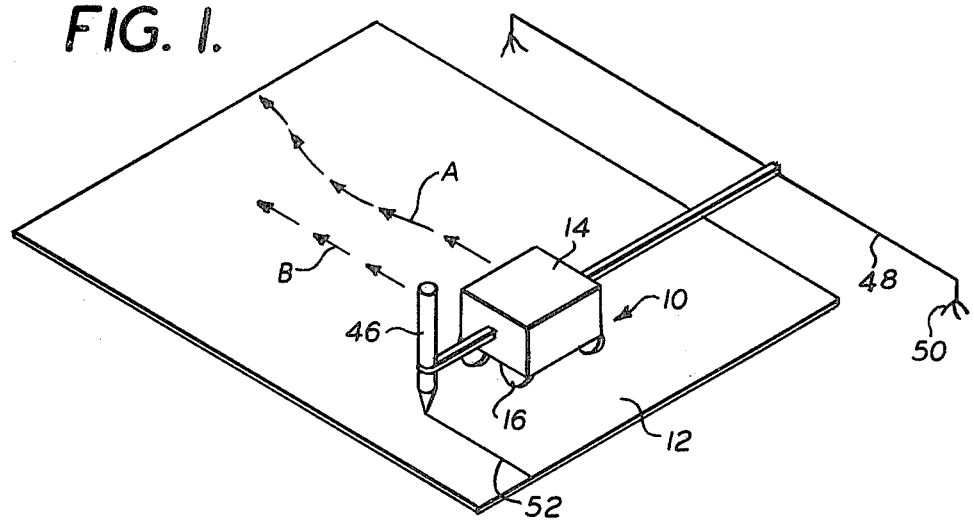
FIG. 1 is a perspective view of the plate cutting device according to the present invention.
Figure 2:
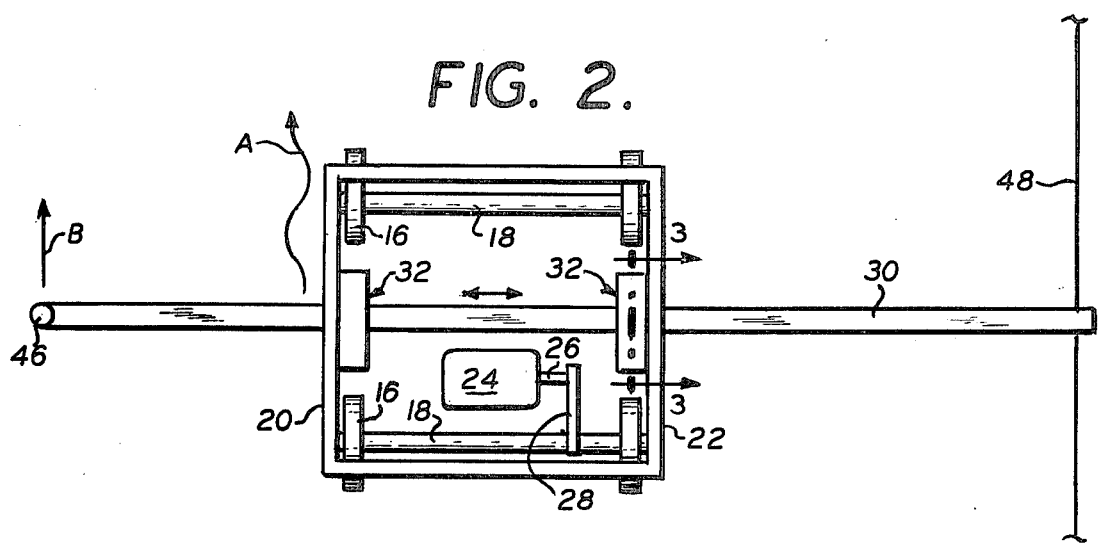
FIG. 2 is a plan view of the device of FIG. 1 with the cover removed.

As seen in FIG. 1, the apparatus of the present invention, depicted generally by the numeral 10, is shown placed over a plate 12 of steel or alike. The apparatus comprises a generally rectangular box-like housing 14, having wheels 16, mounted on a pair of axles 18. The axles 18 are suitably journalled for free rotation in the front and rear walls 20 and 22 of the housing forming thus a movable carriage designed to move sideways only. Mounted within the housing on a suitable bracket or support is a motor 24, preferably electric, although a gas driven engine can also be used. The housing may contain a battery source or gas reservoir for the motor, or the motor may be connected to an exterior source of energy. Preferably, since an electric motor is used, it is of the reversible type, so that the carriage can move in any sideways direction. The motor shaft 26 is connected by a belt or chain transmission 28 to one of the axles 18 so as to be able to drive the carriage. The transmission may include variable pulleys or cog wheels to increase or decrease the speed of the motor, if desired.

Extending through the front and rear walls 20 and 22 respectively is an elongated support rod 30 of rectangular cross section, square is preferable. The rod is also preferably solid so as to be rigid and to permit cantilevered extension from the carriage without distortion. The rod 30 is borne by a journal 32 in each of the walls so as to be freely movable with respect to the carriage in a direction parallel to the longitudinal axis of the rod.

Figure 3:
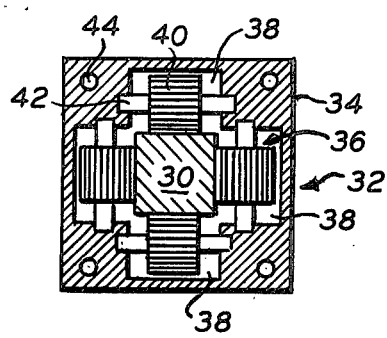
FIG. 3 is a sectional view of the journal taken along line 3—3 of FIG. 2.

As seen in FIG. 3, each journal 32 comprises a box-like arrangement formed of a rectangular hollow frame 34 having a cruciform interior 36 providing four wells 38 in two opposed pairs. Within each well is mounted a cylindrical roller 40 secured to an axle 42. The axles and rollers of each of the pairs are arranged parallel to each other so that the rollers ride on opposite faces of the supporting rod 30. The axles 42 are set within bores for free rotation. For ease of construction, the journal frame 34 may be made in two parts, sliced as seen in FIG. 3 to enable the rollers to be inserted therein. The two halves, are then bolted together by suitable bolts through holes 44 which secure the rollers in place, and which also enable the journals to be secured to the respective walls of the housing.

Because of the construction shown, the rollers can be mounted with extremely little play and with flush contact on the face of the rods. Thus, the rods are capable of linear movement without undue play either up or down or sideways.

Mounted at the flat end of the rod is a work means 46 such as an acetylene torch or other cutting instrument. Preferably, the work means, such as a torch, is mounted as described in my aforementioned patent applications and is movable and pivotable about its axes to provide any desired bevel or contour cutting. The description of the aforementioned patent applications are incorporated herein as if more fully set forth. The fuel reservoir for the cutting instrument, and its controls may be mounted in the housing, or on the housing or in fact may be even remote therefrom since such means do not play a part in the operation of the present invention.

Formed at the rear end of the rod is a small hole extending transversely to its longitudinal axis. Instead of the hole an eye or similar hook member may be used. The hole or hook member is adapted to receive an elongated guy such as a wire, string, or similar member which is tied taut at its ends to a stake or other support. The guy need be chosen only of a material which over its length is capable of being stretched and maintain a substantially taut condition. As will be seen from the discussion herein, the guy need not be strong or placed under great tension, since very little force will be exerted on it. If desired, the guy may be a narrow rail or pipe, provided that it fits through the hole or the hole is adapted or replaced with a suitable eye or hook to cooperate with it.

The purpose of the guy is to retain the forward end of the rod in a fixed relative position with regard to the base line, namely the guy itself, while being movable parallel to the guy. Since the length of the supporting rod is fixed, and the carriage or housing 10 is capable of moving freely with respect to the carriage, this parallel position will be maintained even though the carriage is moved sideways in a generally perpendicular direction to the longitudinal axis of the rod. Thus, no stress or pull is exerted on the guy by the support rod. Further, since the rod maintains its fixed position extending perpendicular to the guy, the movement of the carriage will not interfere with this position, but will only carry the rod along with it in the direction of its own movement. Thus, the housing or carriage needs very little if any guidance in its movement and can take an erratic course as shown by the arrow A without disturbing of the position of the torch at the forward end relative to the base line. The torch will follow its movement, but will maintain a parallel course indicated by the arrow B to the guy 48. Thus, the construction of the cutting apparatus and its carriage, can be greatly simplified in that guidance means, programming means and automatic controls for the carriage can be entirely eliminated. At most, if desired, simple microswitches can be placed on the housing which sense contact with the torch, or the edge of the plate or similar end positions, so that the carriage can be stopped if it interferes with the torch or moves off the plate.

The operation of the present apparatus is simple and illustrated in FIG. 1. The carriage need only be placed on or near the plate and the guy placed in position parallel to the desired line of cut as intended, indicated by the line 52. The motor is then activated and the carriage made to move sideways across the plate along the path A. This path may for any reason be erratic, and may even be up and down due to waves within the sheet itself. However, the torch 46 will move in its path B perfectly parallel to the guy, no matter what deviation the carriage takes from its intended sideways path. The deviation of the carriage is in part translated to sliding movement of the plate, since the rod maintains its fixed position in its box-like journal and because of the paired rollers, does not cant or bind the carriage. The movement of the torch can be controlled independently to provide bevelled cutting as described in the aforementioned patent applications.

Because the carriage need only contain the motor and the journal for the support rod, the carriage can be small and light-weight and easily transportable. The guy itself can be an elongated wire, which can be rolled into a small form. Thus, the present apparatus is capable of being used easily in the field, does not require any extensive programming, or any complex operation for its set-up.

Various modifications, changes and embodiments have been suggested herein, others will be obvious to those skilled in the present art. Accordingly, it is therefore intended that the present disclosure be taken only as illustrative of the invention and not as restricting.

What is claimed is:

1. Apparatus for cutting sheet plate comprising a trackless carriage, an elongated support rod journalled in said carriage for free linear movement relative to said carriage along a path parallel to the longitudinal axis of the rod, means for propelling said carriage in a direction substantially perpendicular to the longitudinal axis of the rod, an elongated extending guy mounted free of said carriage, means at one end of said rod for working said plate, and means on the other end of said rod cooperating with said guy whereby said rod is carried by said carriage in a direction perpendicular to the axis of the rod while said work means maintains a fixed position parallel to said guy irrespective of the direction of movement of the carriage.

2. The apparatus according to claim 1, wherein said carriage comprises a rectangular housing, having front and rear walls, journal means mounted in said front and rear walls for said support rod, said support rod being mounted in said journal means for free movement relative to said carriage.

3. The apparatus according to claim 1 or 2, wherein said guy comprises an elongated wire and said rod is formed with means for engaging said wire.

4. The apparatus according to claim 1 or 2, wherein said guy is an elongated rail, and said rod is provided with means for slidably engaging said rail.

5. The apparatus according to claim 1 or 2, wherein said rod is rectangular in cross section and said journals comprise roller bearing means engaging each of the faces of said rod.

* * * * *